(No Model.)
S. M. SCHINDEL.
ARMOR FOR PNEUMATIC TIRES.
No. 526,846. Patented Oct. 2, 1894.
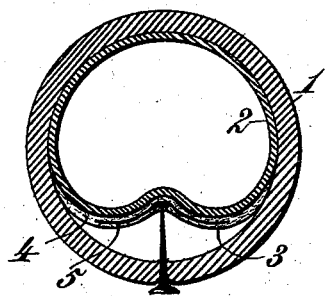
Witnesses.
G. G. Gray
Dennis Sumby
Inventor.
Samuel Milford Schindel,
By Chas. B. Tilden
Atty.

UNITED STATES PATENT OFFICE.

SAMUEL MILFORD SCHINDEL, OF HAGERSTOWN, MARYLAND.

ARMOR FOR PNEUMATIC TIRES.

SPECIFICATION forming part of Letters Patent No. 526,846, dated October 2, 1894.

Application filed March 5, 1894. Serial No. 502,467. (No model.)

*To all whom it may concern:*

Be it known that I, SAMUEL MILFORD SCHINDEL, a citizen of the United States, residing at Hagerstown, in the county of Washington and State of Maryland, have invented new and useful Improvements in Punctureless Armor for the Air-Tubes of Pneumatic Tires or Rubber Air-Receptacles, of which the following is a specification.

It is the purpose of my invention to provide a punctureless armor for the air-tubes of pneumatic tires for bicycles and other vehicles, or for rubber air receptacles, my object being to afford a complete protection to the inflated air tubes, or receptacles, against puncture, and consequent collapse, without sensibly increasing the weight, or the cost of manufacturing this class of tires, or air receptacles.

To enable others skilled in the art to which my said invention pertains to clearly understand and to make and use the same, I will describe said invention in detail, reference being had to the accompanying drawings, in which—

Figure 1 is a transverse section of the punctureless armor in the form in which it appears before it is united with the pneumatic tire, or air receptacle. Fig. 2 is a similar section, showing a slightly modified, but equivalent construction. Fig. 3 is a transverse section of a pneumatic tire, showing the manner in which the armor is used, and illustrating the effect thereon of a sharp point penetrating the outer cover.

The reference-numeral 1 in said drawings, indicates the outer covering of a pneumatic tire for a bicycle, or other vehicle, the construction being of any known, or preferred kind. The numeral 2 denotes the inner, inflated air-tube. The form and dimensions of these parts may be widely varied, as my invention is applicable to any type of pneumatic tire, or rubber air-receptacle, without change.

The numeral 3 indicates the punctureless armor, which consists of a sheath, or cover, of any suitable textile fabric or other material. This sheath contains fibrous material 4, such as raw cotton, and a core 5, which may either be embedded in the fibrous material or cotton, or arranged between the same and the sheath, as shown in Figs. 1 and 2, respectively. Said core may be formed of textile fabric, but any suitable flexible material may be substituted, if preferred. If desired, it may be treated with a sizing solution, or other suitable material, in order to give it a sufficient body, but this treatment does not necessarily form any part of my invention, as it may be entirely omitted.

When the core is embedded in the fibrous material, I prefer to locate it at, or about midway the thickness of the same, though I may vary its location in any degree in order to secure the best results. It may, also, be arranged between the mass of fibrous material and the sheath, in which case it is preferably placed adjacent to the air-tube, from which it is separated by the intervening sheath.

The core 5 fully supplements the tensile strength in which the fibrous material is deficient, and plays an important part in maintaining the relative position of the different portions of said fibrous material, in enabling it to retain its uniform density and mass, throughout, and in preventing the buckling of the armor and its displacement in the tube.

By my invention I am able to dispense with fastening the marginal portions of the armor to the air-tube, and I provide an extremely light, inexpensive, durable, and punctureless protection, capable of use upon all forms of pneumatic tires or air receptacles for bicycles and other vehicles.

Heretofore, and prior to my invention, an armor for pneumatic tires has been made consisting of a body of fibrous material inclosed in a sheath, but in all armor of this type practical experience has developed two fatal objections. The fibrous material soon "bunches," or works gradually into closely packed masses of unequal volume, and is drawn away at different places from its normal position, thereby leaving the air-tube without protection at such points. It has been found impossible, in actual use, to prevent this displacement unless special means of some kind are devised for such purpose. This "bunching" not only destroys the efficiency of the armor, so far as protection is regarded, but it is positively injurious, as it chafes and destroys the air-tube, by wearing holes therein, or by rupturing it. It has been found impossible, also, to draw such armor into the pneumatic tire unless provision is made for imparting to it a tensile strength which it does not normally possess. My present invention wholly overcomes both these objections. Severe practical tests have shown that the flexible core, which forms an essential element of my armor, not only gives ample tensile strength but wholly prevents the "bunching" of the fibrous material and causes it to maintain uniform density throughout, besides adding largely to the capacity for offering impenetrable resistance. I am able, thus, to accomplish these important results not only without sensibly increasing the weight of the armor, or of the tire, but to provide a punctureless, permanently durable armor of less weight than that used heretofore.

What I claim is—

1. A punctureless armor for the purposes described, consisting of an inclosed body of fibrous material, as raw cotton, and a flexible core having contact with the fibrous material, substantially as described.

2. A punctureless armor for the purposes set forth, the same consisting of a body of fibrous material, as raw cotton, and a flexible core, inclosed within a sheath, or covering, of textile or other fabric, substantially as described.

3. A punctureless armor for the purposes specified, the same consisting of a body of fibrous material, as raw cotton, inclosed within a suitable covering, or sheath, and a flexible core embedded within said fibrous material, substantially as described.

In testimony whereof I have hereunto set my hand in presence of two subscribing witnesses.

SAMUEL MILFORD SCHINDEL.

Witnesses:
EWELL A. DICK,
CHAS. B. TILDEN.